United States Patent [19]
Kobayaski et al.

[11] 4,100,531
[45] Jul. 11, 1978

[54] BIT ERROR RATE MEASUREMENT ABOVE AND BELOW BIT RATE TRACKING THRESHOLD

[76] Inventors: James C. Fletcher, Administrator of the National Aeronautics and Space Administration, with respect to an invention of; Herbert S. Kobayashi, Webster; Joe Fowler, Pearland, both of Tex.; William Kurple, Phoenix, Ariz.

[21] Appl. No.: 765,167

[22] Filed: Feb. 3, 1977

[51] Int. Cl.² .................................... G08C 25/00
[52] U.S. Cl. ............................ 340/146.1 E; 325/41; 340/146.1 AX
[58] Field of Search ............. 340/146.1 E, 146.1 AX; 325/42, 41; 178/69 A, 69.1

[56] References Cited
U.S. PATENT DOCUMENTS

| | | | |
|---|---|---|---|
| 3,069,498 | 12/1962 | Frank | 340/146.1 E |
| 3,496,536 | 2/1970 | Wheeler et al. | 340/146.1 E |
| 3,562,710 | 2/1971 | Halleck | 340/146.1 E |
| 3,622,877 | 11/1971 | MacDavid | 340/146.1 E |
| 3,824,548 | 7/1974 | Sullivan et al. | 340/146.1 E |
| 3,914,740 | 10/1975 | Han | 340/146.1 E |

*Primary Examiner*—Charles E. Atkinson
*Attorney, Agent, or Firm*—Marvin J. Marnock; John R. Manning; Marvin F. Matthews

[57] ABSTRACT

Bit error rate is measured by sending a pseudo-random noise (PRN) code test signal simulating digital data through digital equipment to be tested. An incoming signal representing the response of the equipment being tested, together with any added noise, is received and tracked by being compared with a locally generated PRN code. Once the locally generated PRN code matches the incoming signal a tracking lock is obtained. The incoming signal is then integrated and compared bit-by-bit against the locally generated PRN code and differences between bits being compared are counted as bit errors.

12 Claims, 4 Drawing Figures

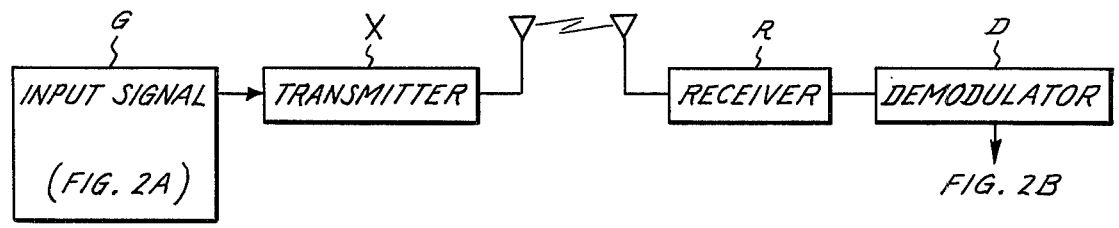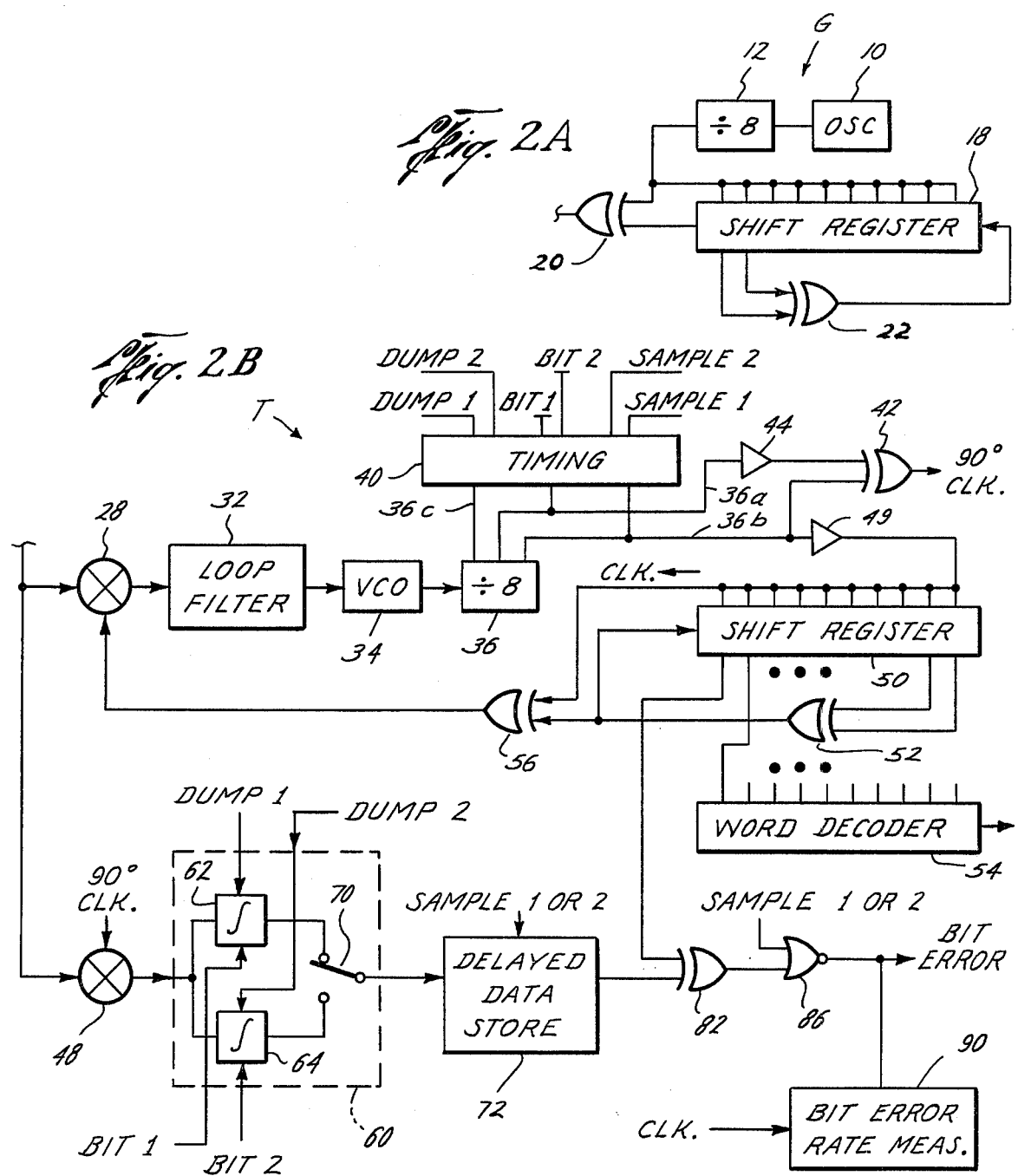

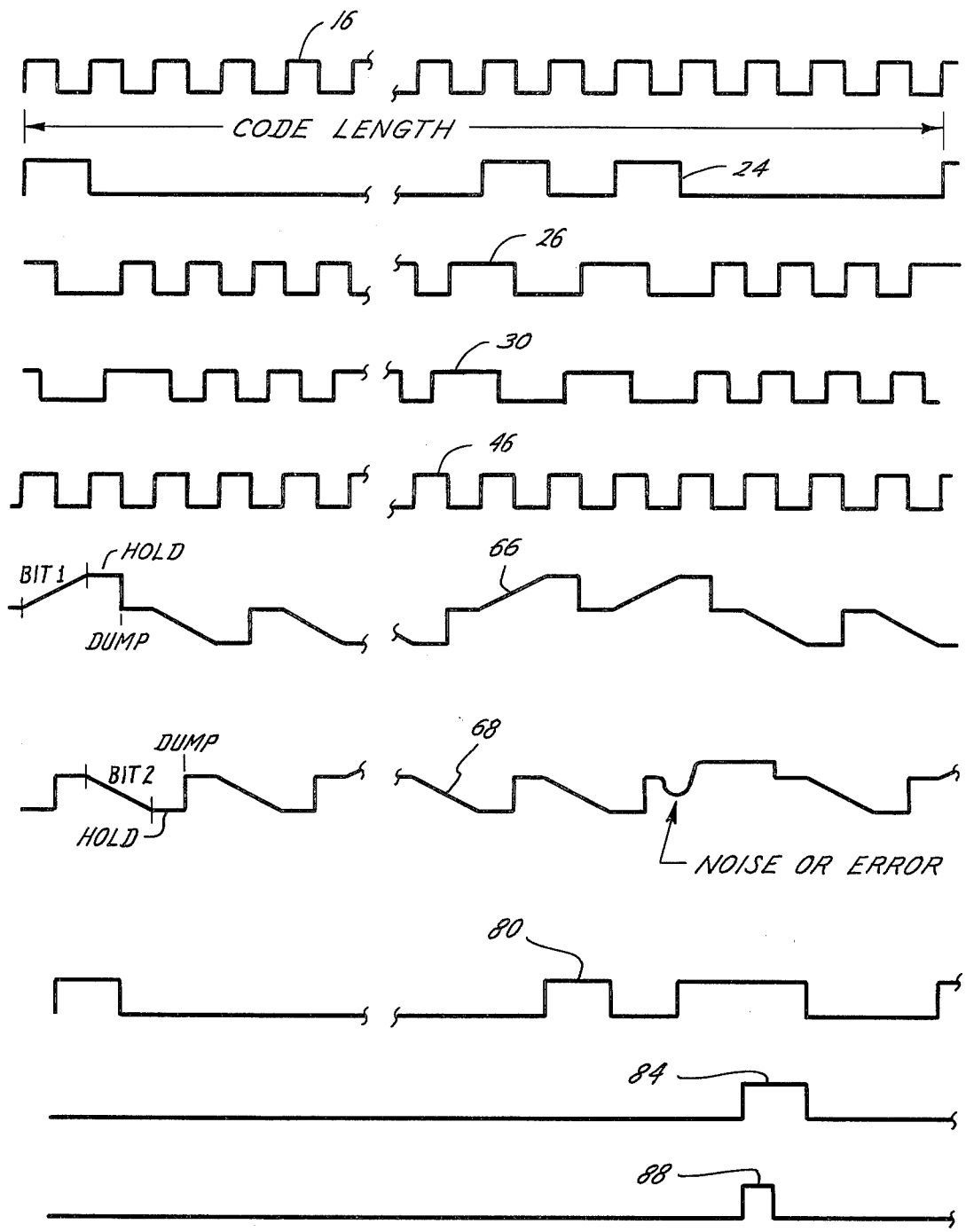

BIT ERROR RATE MEASUREMENT ABOVE AND BELOW BIT RATE TRACKING THRESHOLD

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 45 U.S.C. 2457).

BACKGROUND OF THE INVENTION

1. Field of the Invention

The present invention relates to measurement of bit error rate in communication systems and circuits.

2. Description of Prior Art

So far as is known, prior art error detection systems were of two general types: closed loop systems and open loop systems.

In closed loop systems, such as in U.S. Pat. Nos. 3,916,379 and 3,934,224, the signal as sent by a communication system under test was compared with the signal as received, requiring a signal path in addition to the one for the system under test. Thus with closed loop systems, bit error rate measurement of radio frequency (RF) communication links was difficult.

With open loop systems, such as in U.S. Pat. No. 3,914,740, a distinctive, self-identifying, pseudo-random noise (PRN) sequence was used as a test signal and sent over a communication link to the system under test. A replica of the PRN sequence was formed at the receiver of the system under test and compared with the PRN sequence received over the communication link under test. However, this type of system required a relatively "clean," i.e., low noise, communication link and was thus not suitable for bit error rate testing of low signal-to-noise radio communication systems and links. Further, since bit-by-bit comparison required bit synchronization between the received PRN sequence and its replica, bit error rate testing became difficult when the bit rate neared the tracking threshold of the bit synchronizer.

SUMMARY OF THE INVENTION

Briefly, the present invention provides a new and improved apparatus for testing the bit error rate of a digital communication equipment such as data transmission systems as well as subassemblies or components thereof. A test digital code signal simulating data is formed and applied to the equipment being tested. An incoming signal representing the response of the equipment to the test signal is received, and the digital code of the test signal is tracked so that a simulated reproduction of the test digital code signal may be formed. The incoming signal and its reproduction are multiplied together in tracking. The incoming signal can be tracked, since only one null point occurs, when the incoming code and its simulated reproduction match, at which time it is known that the simulated reproduction is accurate.

Once tracking is achieved, the incoming signal is integrated and stored for one bit interval, sampled and compared with the reproduction and any discrepancies are noted as bit errors.

With the present invention, only one communication line or path is required. Further, the length of the digital code word rather than data rate is determinative of tracking threshold, permitting bit error rate testing above and below the tracking threshold.

It is an object of the present invention to provide for new and improved testing of the bit error rate of communication equipment.

BRIEF DESCRIPTION OF THE DRAWINGS

FIG. 1 is a schematic diagram of a testing arrangement for communication equipment according to the present invention;

FIGS. 2A and 2B are digital circuit logic diagrams of apparatus of the present invention; and FIG. 3 is a voltage waveform diagram of signals present in the apparatus of FIG. 2.

DESCRIPTION OF THE PREFERRED EMBODIMENT

In the drawings (FIG. 1), a code generator G for forming and applying a test digital code signal simulating data to communication equipment is shown. As used in the present invention, the term communication equipment is intended to include digital transmission and communication systems, digital sub-assemblies for use in such systems, and/or components used in such sub-assemblies or systems. In FIG. 1, the communication equipment under bit error rate test according to the present invention includes a transmitter X, a receiver R and a demodulator D communicating over a wireless communication link. However, it should be understood that telephonic or telegraphic communication over wired communication circuits may be tested according to the present invention as well. A testing circuit T of the present invention receives an incoming signal from the equipment being tested and detects bit errors therein, in a manner to be set forth.

Considering now the code generator G (FIG. 2A), a pseudo-random noise (PRN) code is formed therein representing pulse code modulation (PCM) data to simulate digital data as an input signal to the equipment being tested. An oscillator 10 and a frequency divider 12 form output clock signal 16 (FIG. 3) which is applied to a shift register 18 (FIG. 2) and an EXCLUSIVE OR gate 20.

An EXCLUSIVE OR gate 22 is connected to two of the stages of the shift register 18 to form the pseudo-random noise code therein in a conventional manner. The shift register 18 may be of any suitable number of digital stages in accordance with the desired length of the input pseudo-random noise digital data code to be formed therein. The stages of the shift register 18 to which the gate 22 is connected is also determined by the desired length of the pseudo-random noise digital data code to be formed in the generator G. A waveform 24 (FIG. 3) indicates an example test digital code from the shift register 18, whose code word length is indicated thereabove. The waveforms 16 and 24 are furnished as input signals to the gate 20 which forms a split phase pseudo-random noise waveform 26 (FIG 3) applied as the input test digital code signal to the digital equipment being tested. The split phase pseudo-random noise waveform 26 is then transmitted through the equipment being tested and applied as an incoming signal to the testing circuit T (FIG. 2B).

In the testing circuit T, the incoming signal, representing the waveform 26 together with any noise and distortion added by the equipment under test, is multiplied in a multiplier 28 of a tracking circuit with a tracking signal, exemplified by a waveform 30 (FIG. 3)

which is formed in a manner to be set forth. The multiplier 28 forms an error signal which is received by a loop filter 32 and provided to a voltage-controlled oscillator (VCO) 34 to form an output signal having a frequency at four times the frequency of the incoming signal, from which a clock signal is derived in a manner to be set forth. A divider circuit 36 in the form of three cascaded divide-by-two flip-flops receives the output from the voltage control oscillator 34 and forms three output signals: an output signal over a conductor 36a at twice the data frequency; an output signal over a conductor 36b at the data frequency and an output signal over a conductor 36c at half the data frequency. A timing circuit 40 receives the three output signals from the divider 36 and forms timing cycle or control signals in accordance with the test circuit timing chart set forth below:

test digital code signal. A word decoder circuit 54, a digital circuit composed of gates to sense a reproduction of the test digital code signal, is connected in parallel with the shift register 50 and detects when the reproduction of the test digital code signal from the shift register 50 matches the test digital code signal from the code generating circuit G.

The output EXCLUSIVE OR gate 52 is further provided to an EXCLUSIVE OR gate 56 which receives the clock pulse from the inverter 49 and converts the NRZ output of gate 52 to the split-phase pseudo-random tracking signal 30. The split-phase pseudo-random tracking signal waveform 30 from the gate 56 is provided as an input to the multiplier 28 to form the error signal and control the tracking by the loop filter 32 and the oscillator 34 in the manner set forth above.

From the foregoing, it can be seen that the filter 32,

TEST CIRCUIT TIMING CHART

| TIME | COND. 36a | COND. 36b | COND. 36c | TIMING CYCLE SIGNALS | | |
|------|-----------|-----------|-----------|----------------------|--|--|
| $t_1$ | 0 | 0 | 0 | ↑ | SAMPLE 2 or SAMPLE 2 | HOLD |
| $t_2$ | 0 | 0 | 1 | Integrate BIT 1 | DUMP 2 or DUMP 2 | |
| $t_3$ | 0 | 1 | 0 | ↓ | | |
| $t_4$ | 0 | 1 | 1 | HOLD { SAMPLE 1 or SAMPLE 1 DUMP 1 or DUMP 1 | ↑ Integrate BIT 2 ↓ | |
| $t_5$ | 1 | 0 | 0 | | | |
| $t_6$ | 1 | 0 | 1 | | | |
| $t_7$ | 1 | 1 | 0 | | | |
| $t_8$ | 1 | 1 | 1 | | | |

As will be understood by those of ordinary skill in the art, numerous conventional digital gating arrangements may be utilized within the timing circuit 40 to form the signals set forth in the timing chart above. For example, the BIT 2 timing signal is available on conductor 36a while the BIT 1 timing signal is available through an inverter from the conductor 36a. Similarly, the DUMP 2 timing signal may be formed by an AND gate connected to both the conductor 36b and the inverter forming the BIT 1 signal, while the SAMPLE 2 timing signal may be formed by an AND gate receiving both the BIT 1 signal and an inverted version of the signal on conductor 36b. In a like manner, the DUMP 1 and SAMPLE 1 signals may be formed with AND gates and inverters on the conductor 36b in conjunction with the BIT 2 signal.

An EXCLUSIVE OR gate 42 is connected to the signal present on conductor 36b at a first input thereof and at a second input thereof receives an inverted version of the signal on conductor 36a from an inverter 44 forming therefrom a 90° CLOCK signal in phase quadrature with the incoming signal as exemplified by a waveform 46 (FIG. 3). The 90° CLOCK signal 46 from the gate 42 is provided to a multiplier 48 of the comparator circuit C where the incoming signal is multiplied with the clock signal from gate 42, for reasons to be set forth.

The signal at the data frequency on the conductor 36b to the timing circuit 40 is provided through an input inverter 49 as a clock signal to a shift register 50. The shift register 50 is of like capacity to the shift register 18 in the code generator circuit G and further has an EXCLUSIVE OR gate 52 connected to the output thereof in a like manner to the EXCLUSIVE OR gate 20 connected to the register 18. Accordingly, the shift register 50 and gate 52 form a pseudo-random bit sequence in non-return to zero (NRZ) form as a reproduction of the oscillator 34, divider 36, shift register 50 and gates 52 and 56 form a tracking loop to track the incoming signal. In this tracking loop, only one null occurs, when the incoming signal is in phase quadrature with the waveform 30, thereby providing ease in tracking. Also, by grouping code bits into a digital code word, the probability of error can be made so low the word can be used to represent acquisition and lock.

Returning now to the multiplier 48, such multiplier receives the 90° CLOCK signal 46 as well as the incoming signal and forms therefrom a product output signal which is provided to a match filter sampling circuit 60. The sampling circuit 60 receives the output of the multiplier 48 for successive time intervals and includes a first integrator 62 and a second integrator 64 whose operations are controlled by the timing circuit 40 in accordance with the timing chart set forth above. The first integrator 62 integrates the output signal from the multiplier 48 in response to the BIT 1 control signal from the timing circuit 40 forming an output waveform indicated by a waveform 66. The integrator 64 integrates the product function formed in the multiplier 48 in response to the BIT 2 control signal forming an output waveform 68.

The first integrator 62 is caused to clear its contents in response to the DUMP 1 timing signal from the timing circuit 40, while the second integrator 64 is caused to clear itself of its contents in response to the DUMP 2 timing signal from the timing circuit 40. The contents of the integrators 62 and 64 are alternately supplied through a digital switch 70 to a delayed data store or sample-and-hold circuit 72 in response to SAMPLE 1 and SAMPLE 2 control signals from the timing circuit 40. The integrator 62 transfers its contents to the sample-and-hold circuit 72 through the switch 70 in response to the SAMPLE 1 control signal from the timing circuit 40. Similarly, the integrator 64 transfers its contents to the sample-and-hold circuit 72 through the switch 70 in response to the SAMPLE 2 control signal from the timing circuit 40. The contents transferred to sample-and-hold circuit 72 from integrators 62 and 64 are thus not actual digital data. Rather, they represent a statistical estimate, due to the integration of the probability of the incoming data being a particular bit state.

The sample-and-hold circuit 72 furnishes an output waveform 80 to an EXCLUSIVE OR gate 82 at a first input thereof. The gate 82 receives the output of the shift register 50 at a second input thereof. The gate 82 serves as a comparator gate and compares the contents of the storing or sample-and-hold circuit 72 with a reproduction of the test digital code signal formed in shift register 50 in the manner set forth above. The comparator OR gate 82 thus forms an output waveform 84. When the contents of the shift register 50 differ from the contents of the sample-and-hold circuit 72, an output pulse is formed, as shown in waveform 84, which is provided through a detector NOR gate 86 in response to a SAMPLE 1 or a SAMPLE 2 control signal from the timing circuit 40 to indicate a bit error in the incoming data, as indicated by a waveform 88. The indicator NOR gate 86 provides the output signal in waveform 88 indicating a bit error to a bit error counter circuit 90 which counts the number of bit errors indicated by the detector gate 82 over a testing interval. If desired, the counter circuit 90 may have a second counter therein counting the clock pulses so that a ratio of the contents of the bit error counter and the clock counter may be formed indicating the bit error rate in the digital communication equipment being tested.

In the operation of the present invention, the code generator G is connected to the input of the digital communication equipment to be tested, and a pseudo-random noise (PRN) code signal simulating the pulse code modulation data signal is applied as a test digital code signal. After the signal has moved through the equipment being tested, it is received as an incoming signal at the testing circuit T. The tracking loop filter 32 and voltage-controlled oscillator 34 begin tracking the incoming signal, and the shift register 50 and EXCLUSIVE OR gate 52 form a reproduction of the test digital code signal in response to the signal from the oscillator 34 through the inverter 49. The shift register 50 shortly matches the test digital code signal so that thereafter the reproduction of the test signal and the test signal match, since there is only one null in the error signal — one which occurs when the incoming signal 26 is in phase quadrature to the waveform 30. When tracking occurs, the incoming signal is multiplied in the multiplier 48 by the 90° CLOCK signal to produce an output signal which is alternately integrated in the integrators 62 and 64 of the circuit 60 and sampled and stored in an interleaved manner in the circuit 72. It is to be noted that the output of the circuit 60 does not represent an attempt to precisely define whether the incoming digital data is "1" or "0," but rather represents the probability that the detected bit is in one particular bit state. The comparator gate 82 compares the reproduction of the test digital code signal from the shift register 50 with the output of the sampling circuit 72, indicating when the two input signals thereto differ so that the NOR gate 86 may detect when the bits differ and indicate a bit error which is counted by the counter 90.

Accordingly, with the present invention, the use of a pseudo-random noise digital code sequence with comparison and detection of an identity thereto at the receiver removes the restraint placed on prior bit error rate detection by the bit rate tracking threshold of the bit synchronizer. Thus, with the present invention, a large system or a portion of a communication system may be tested while requiring only one line, since the pseudo-random code sequence is determined by the wiring interconnections in the code generator G and the code length so established establishes the bit tracking threshold of the apparatus, rather than the actual bit rate of single digital bits. Thus, with the present invention, bit error rates may be detected in a noisy signal due to the phase-lock loop tracking the noisy signal and the integrator circuit 60 making a best estimate of the received group of bits for bit-by-bit comparison to determine the bit error rate.

If desired, the signal-to-noise ratio of the equipment under test may be varied and bit error rates obtained for each signal-to-noise ratio. The bit error rate, once measured in the manner set forth above, may be used as a basis to adjust the circuitry of the tested equipment such as design changes, filter adjustments, clipping level changes, etc.

The foregoing disclosure and description of the invention are illustrative and explanatory thereof, and various changes in the size, shape, materials, components, circuit elements, wiring connection and contacts as well as in the details of the illustrated circuitry and construction may be made without departing from the spirit of the invention.

We claim:

1. An apparatus for testing the bit error rate of communication equipment, comprising:
   a. means for forming and applying a test digital code signal simulating data to the equipment being tested, said means including means forming a pseudo-random bit sequence for said code signal;
   b. means for receiving an incoming signal from the equipment in response to the test signal;
   c. tracking means for tracking the incoming signal;
   d. means responsive to said tracking means for forming a reproduction of the test digital code signal;
   e. comparator means for comparing the reproduction with the incoming signal to detect bit errors in the equipment being tested, said tracking means including
      i. means for deriving a clock signal from the incoming signal;
      ii. means connected to and responsive to said clock signal deriving means and to said means for forming a reproduction to produce a split phase pseudo-random noise tracking signal; and
      iii. means for multiplying the incoming signal with said tracking signal to form an error signal, said clock signal deriving means comprising means for deriving a clock signal in phase quadrature with the incoming signal from the incoming signal.

2. The apparatus of claim 1, wherein said means for deriving comprises:
   a. loop filter means for receiving the error signal from said means for multiplying;
   b. oscillator means responsive to the error signal from said loop filter means for forming an output frequency signal;
   c. frequency divider means for dividing the output frequency signal of said oscillator means; and d. gate means for forming clock pulses in phase quadrature with the clock signal.

3. An apparatus for testing the bit error rate of communication equipment, comprising:
   a. means for forming and applying a test digital code signal simulating data to the equipment being tested, said means including means forming a pseudo-random bit sequence for said code signal;
   b. means for receiving an incoming signal from the equipment in response to the test signal;
   c. tracking means for tracking the incoming signal;
   d. means responsive to said tracking means for forming a reproduction of the test digital code signal; and
   e. comparator means for comparing the reproduction with the incoming signal to detect bit errors in the equipment being tested, said tracking means including
      i. means for deriving a clock signal from the incoming signal;
      ii. means connected to and responsive to said clock signal deriving means and to said means for forming a reproduction to produce a split phase pseudo-random noise tracking signal; and
      iii. means for multiplying the incoming signal with said tracking signal to form an error signal, said comparator means comprising
      comparator multiplier means for multiplying the incoming signal with the clock signal;
      means for receiving the output of said comparator multiplier means for successive time intervals;
      means for storing the contents of said means for receiving; and
      comparator gate means for comparing the contents of said storing means with a reproduction of the test digital code signal.

4. The apparatus of claim 3, further including:
   detector gate means responsive to said comparator gate means for indicating bit errors when the contents of said means for storing differ from the reproduction of the test digital code signal.

5. The apparatus of claim 4, further including:
   bit error counter means for counting the number of bit errors indicated by said detector gate means.

6. The apparatus of claim 5, further including:
   clock counter means for counting the number of clock pulses wherein the bit error rate may be determined from the ratio of the contents of said bit error counter and said clock counter.

7. A method of testing the bit error rate of communication equipment, comprising the steps of:
   a. forming and applying a test digital code signal simulating data to the equipment being tested, said code signal having a pseudo-random bit sequence;
   b. receiving an incoming signal from the equipment in response to the test signal;
   c. tracking the incoming signal;
   d. forming a reproduction of the test digital code signal; and
   e. comparing the reproduction with the incoming signal to detect bit errors in the equipment being tested, said tracking step comprising
      i. deriving a clock signal from the incoming signal wherein said clock signal is in phase quadrature with the incoming signal;
      ii. deriving a split phase pseudo-random noise tracking signal from the clock signal and reproduction signal; and
      iii. multiplying the incoming signal with said split phase pseudo-random noise tracking signal to form an error signal.

8. The method of claim 7, wherein said step of deriving comprises:
   a. filtering the error signal;
   b. forming an output frequency signal in response to the filtered error signal;
   c. dividing the output frequency signal; and
   d. forming clock pulses in phase quadrature with the clock signal.

9. A method of testing the bit error rate of communication equipment comprising the steps of:
   a. forming and applying a test digital code signal simulating data to the equipment being tested, said code signal having a pseudo-random bit sequence;
   b. receiving an incoming signal from the equipment in response to the test signal;
   c. tracking the incoming signal;
   d. forming a reproduction of the test digital code signal, said tracking step comprising
      i. deriving a clock signal from the incoming signal;
      ii. deriving a split phase pseudo-random noise tracking signal from said clock signal and said reproduction signal; and
      iii. multiplying the incoming signal with said split phase pseudo-random noise tracking signal to form an error signal, and
   e. comparing the reproduction with the incoming signal to detect bit errors in the equipment being tested, said step of comparing comprising
      i. multiplying the incoming signal with the clock signal;
      ii. storing the result of said step of multiplying; and
      iii. comparing the stored result of said step of multiplying with a reproduction of the test digital code signal.

10. The method of claim 9, further including:
    indicating bit errors when the stored result differs from the reproduction of the test digital code signal.

11. The method of claim 10, further including:
    counting the number of bit errors.

12. The method of claim 11, further including:
    counting the number of clock pulses wherein the bit error rate may be determined from the ratio of the counted bit errors and counted clock pulses.

* * * * *